(12) United States Patent
Teramoto et al.

(10) Patent No.: US 7,535,530 B2
(45) Date of Patent: May 19, 2009

(54) LIQUID CRYSTAL DISPLAY DEVICE

(75) Inventors: Masahiro Teramoto, Mobara (JP); Junji Tanno, Chiba (JP)

(73) Assignee: Hitachi Displays, Ltd., Chiba (JP)

(*) Notice: Subject to any disclaimer, the term of this patent is extended or adjusted under 35 U.S.C. 154(b) by 135 days.

(21) Appl. No.: 11/747,973

(22) Filed: May 14, 2007

(65) Prior Publication Data

US 2007/0263148 A1    Nov. 15, 2007

(30) Foreign Application Priority Data

May 15, 2006   (JP) .............................. 2006-135253

(51) Int. Cl.
*G02F 1/1335* (2006.01)
(52) U.S. Cl. ........................ 349/117; 349/118; 349/114
(58) Field of Classification Search .................. 349/117
See application file for complete search history.

(56) References Cited

U.S. PATENT DOCUMENTS 7,088,409 B2   8/2006   Itou et al.

2004/0004681 A1   1/2004   Ozawa et al.

FOREIGN PATENT DOCUMENTS

| JP | 2004-226829 | 8/2004 |
|----|-------------|--------|
| JP | 2005-338256 | 12/2005 |

*Primary Examiner*—David Nelms
*Assistant Examiner*—Phu Vu
(74) *Attorney, Agent, or Firm*—Antonelli, Terry, Stout & Kraus, LLP.

(57) ABSTRACT

The present invention provides a liquid crystal display device including a liquid crystal display panel, wherein the liquid crystal display panel includes a pair of substrates, liquid crystal which is sandwiched between the pair of substrates, a plurality of sub pixels, each sub pixel including a transmissive portion and a reflective portion, a light blocking film which is formed on one substrate out of the pair of substrates, color filters which are formed on one substrate out of the pair of substrates, a leveling film which is formed on the light blocking film and the color filters, an orientation film which is formed on the leveling film, a retardation film which is formed on the orientation film at portions corresponding to the reflective portions of the respective sub pixels, and a protective film which is formed on the orientation film and the retardation film.

11 Claims, 7 Drawing Sheets

LIQUID CRYSTAL DISPLAY DEVICE

The present application claims priority from Japanese applications JP2006-135253 filed on May 15, 2006, the content of which is hereby incorporated by reference into this application.

BACKGROUND OF THE INVENTION

1. Field of the Invention

The present invention relates to a liquid crystal display device, and more particularly to a transflective liquid crystal display device which incorporates a retardation film in a color filter substrate side.

2. Description of the Related Art

For example, as described in patent document 1 (JP-A-2005-338256), a transflective liquid crystal display device which includes a transmissive portion and a reflective portion in the inside of one sub pixel is used as a display for a portable equipment.

FIG. 13 is a cross-sectional view showing the cross-sectional structure of an essential part of one sub pixel in one example of a conventional transflective liquid crystal display device. FIG. 13 is also a cross-sectional view illustrated as FIG. 2 in the above-mentioned patent document 1.

In FIG. 13, numeral 10 indicates a liquid crystal layer, numeral 21 indicates scanning lines, numeral 23 indicates common lines, numeral 28 indicates pixel electrodes, numeral 29 indicates counter electrodes (also referred to as common electrodes), numerals 31, 32 indicate glass substrates, numeral 33 indicates a first orientation film, numeral 34 indicates a second orientation film, numeral 35 indicates a third orientation film, numeral 36 indicates color filters, numeral 37 indicates a leveling film, numeral 38 indicates an incorporated phase plate, numeral 41 indicates a first polarizer, numeral 42 indicates a second polarizer, numeral 43 indicates a light diffusion layer, numeral 51 indicates a first insulation film, numeral 52 indicates a second insulation film, numeral 53 indicates a third insulation film, numeral 61 indicates a transmitting light, and numeral 62 indicates a reflection light.

The common lines 23 are configured to project into the inside of the pixel electrode 28 at a portion where the common lines 23 intersect the pixel electrodes 28, and the common lines 23 reflects light as indicated by the reflection light 62 in FIG. 2.

In FIG. 13, portions where the common lines 23 is overlapped to the pixel electrodes 28 constitute reflective portions 131, and overlapped portions of the pixel electrodes 28 and the common electrodes 29 other than the reflective portions 131 constitute transmissive portions 130 which transmit light from a backlight therethrough as indicated by a transmitting light 61 in FIG. 2.

In the transflective liquid crystal display device shown in FIG. 13, a main surface side of a glass substrate (SUB2) constitutes an observation side.

In the conventional transflective liquid crystal display device shown in FIG. 13, the pixel electrodes 28 and the planar counter electrode 29 are stacked by way of an interlayer insulation film 53, and arcuate electric lines of force which are formed between the pixel electrodes 28 and the counter electrodes 29 are distributed in a state such that the electric lines of force penetrate the liquid crystal layer 10 and hence, the orientation of the liquid crystal layer 10 is changed.

A length of a cell gap of the reflective portion 131 is set to an approximately half of a length of a cell gap of the transmissive portion 130. This is because that the light passes the liquid crystal layer 10 twice due to reciprocation in the reflective portion 131 and hence, an optical path length of the transmissive portion 130 and an optical path length of the reflective portion 131 are made to substantially agree with each other.

In the transmissive portion 130, the contrast of light is displayed by making use of the e birefringence of the liquid crystal layer 10, while in the reflective portion 131, the contrast of light is displayed by making use of the birefringence of the incorporated phase plate 38 which is arranged inside a liquid crystal display panel and the liquid crystal layer 10.

Here, as a prior art document related to the present invention, JP-A-2005-338256 is named.

SUMMARY OF THE INVENTION

Conventionally, the transflective liquid crystal display device uses a retardation-plate-incorporated polarizer and hence, a retardation plate exists also in the transmissive portion whereby the retardation plate adversely influences the optical properties thus giving rise to a drawback that it is difficult to realize both of optical properties of the transmissive portion and the reflective portion simultaneously.

In the transflective liquid crystal display device described in the above-mentioned patent document 1, the incorporated phase plate 38 is incorporated in the color filter substrate side and hence, it is possible to realize both of optical properties of the transmissive portion and the reflective portion simultaneously.

However, with the constitution of the transflective liquid crystal display device described in the above-mentioned patent document 1, there exists a possibility that, due to a following manufacturing process, the incorporate phase plate 38 is damaged thus deteriorating the reliability of the transflective liquid crystal display device.

The invention has been made to overcome the above-mentioned drawbacks of the above-described related art and it is an object of the invention to provide, in a transflective liquid crystal display device which incorporates a retardation film on a color filter substrate side, a technique which can prevent a retardation film from being damaged and can enhance the reliability of the transflective liquid crystal display device.

The above-mentioned and other objects and novel features of the invention will become apparent by the description of this specification and attached drawings.

To briefly explain typical invention among inventions disclosed in this application, they are as follows.

(1) The invention provides a liquid crystal display device having a liquid crystal display panel, wherein the liquid crystal display panel includes a pair of substrates, liquid crystal which is sandwiched between the pair of substrates, a plurality of sub pixels, each sub pixel including a transmissive portion and a reflective portion, a light blocking film which is formed on one substrate out of the pair of substrates, color filters which are formed on one substrate out of the pair of substrates, a leveling film which is formed on the light blocking film and the color filters, an orientation film which is formed on the leveling film, a retardation film which is formed on the orientation film at portions corresponding to the reflective portions of the respective sub pixels, and a protective film which is formed on the orientation film and the retardation film.

(2) In the constitution of (1), the leveling film functions also as the orientation film.

(3) The invention also provides a liquid crystal display device including a liquid crystal display panel, wherein the liquid crystal display panel includes a pair of substrates, liquid crystal which is sandwiched between the pair of substrates, a plurality of sub pixels, each sub pixel including a transmissive portion and a reflective portion, a light blocking film which is formed on one substrate out of the pair of substrates, color filters which are formed on one substrate out of the pair of substrates, a leveling film which is formed on the light blocking film and the color filters, an orientation film which is formed on the leveling film at portions corresponding to the reflective portions of the respective sub pixels, a retardation film which is formed on the orientation film, and a protective film which is formed on the leveling film and the retardation film.

(4) The invention also provides a liquid crystal display device including a liquid crystal display panel, wherein the liquid crystal display panel includes a pair of substrates, a liquid crystal which is sandwiched between the pair of substrates, a plurality of sub pixels, each sub pixel including a transmissive portion and a reflective portion, a light blocking film which is formed on one substrate out of the pair of substrates, color filters which are formed on one substrate out of the pair of substrates, a leveling film which is formed on the light blocking film and the color filters, an orientation film which is formed on the leveling film at portions corresponding to the reflective portions of the respective sub pixels, a retardation film which is formed on the orientation film, and a protective film which is formed on the retardation film.

(5) In any one of the above-mentioned constitutions (1) to (4), the liquid crystal display panel further includes a gap adjusting layer which is formed on the protective film.

(6) In any one of the above-mentioned constitutions (1) to (5), the retardation film is made of a polymer liquid crystal material.

(7) In any one of the above-mentioned constitutions (1) to (6), at least the light blocking film is formed in a boundary region between the transmissive portion and the reflective portion of each sub pixel.

(8) In any one of the above-mentioned constitutions (1) to (7), pixel electrodes and counter electrodes are formed on another substrate different from one substrate out of the pair of substrates.

(9) In the above-mentioned constitution (8), an interlayer insulation film is formed on the counter electrodes, and the pixel electrodes are formed on the interlayer insulation film.

(10) In any one of the above-mentioned constitutions (1) to (9), a portion of the counter electrode corresponding to the reflective portion constitutes a reflective electrode.

(11) In any one of the above-mentioned constitutions (1) to (7), the counter electrodes are formed on one substrate out of the pair of substrates, and the pixel electrodes are formed on another substrate different from one substrate.

To briefly explain advantages which are obtained by the typical invention among inventions disclosed in this specification, they are as follows.

According to the invention, in the transflective liquid crystal display device which incorporates the retardation plate on the color filter substrate side, it is possible to prevent the retardation film from being damaged thus enhancing the reliability of the transflective liquid crystal display device.

DESCRIPTION OF THE PREFERRED EMBODIMENTS

Hereinafter, embodiments of the invention are explained in detail in conjunction with drawings.

Here, in all drawings for explaining the embodiments, parts having identical functions are given same numerals and their explanation is omitted.

Embodiment 1

Figure 1:
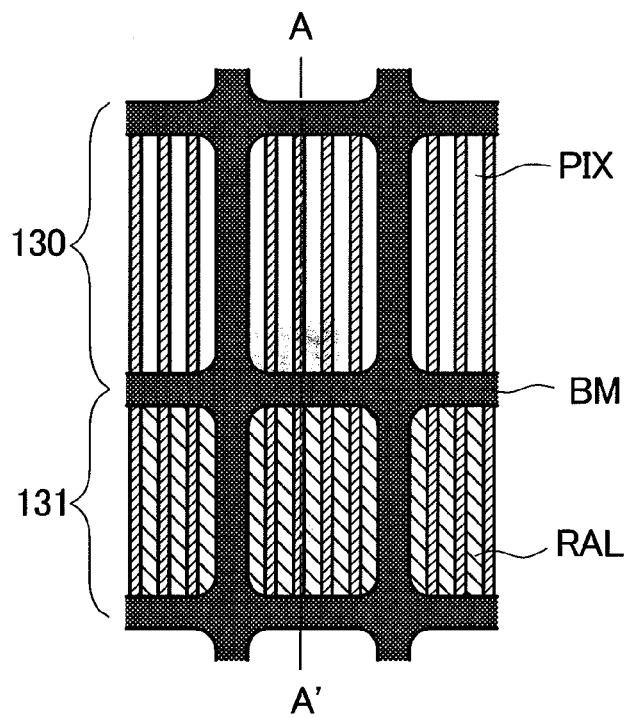
FIG. 1 is a plan view of one sub pixel on a TFT substrate side of a transflective liquid crystal display device according to an embodiment of the invention.
Figure 2:
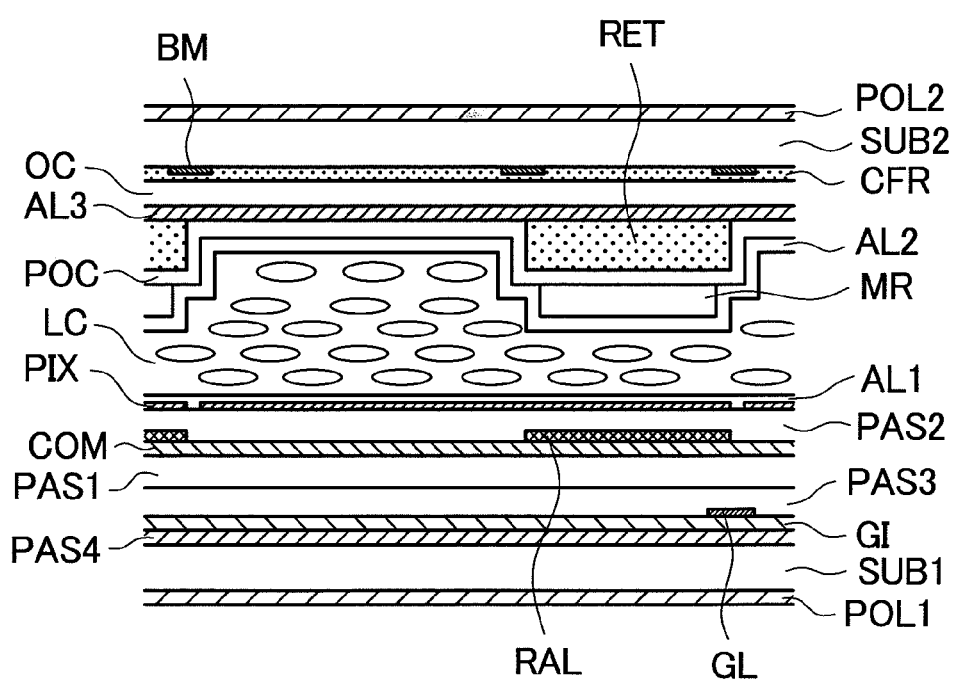
FIG. 2 is a cross-sectional view showing the cross-sectional structure taken along a line A-A' in FIG. 1.

FIG. 1 is a plan view of one sub pixel on a TFT substrate side of a transflective liquid crystal display device according to an embodiment 1 of the invention. FIG. 2 is a cross-sectional view showing the cross-sectional structure taken along a line A-A' in FIG. 1. Here, in FIG. 2, an illustration of columnar spacers which are described later is omitted.

The transflective liquid crystal display device of this embodiment includes a pair of glass substrates (SUB1, SUB2) which sandwich a liquid crystal layer (LC) therebetween. Further, in the transflective liquid crystal display device of this embodiment, a main surface side of the glass substrate (SUB2) constitutes an observation side.

On a liquid crystal layer side of the glass substrate (SUB2; also referred to as a CF substrate), a black matrix (BM), cooler filter layers of red, green and blue (CFR, CFG, CFB; only CFR shown in FIG. 2), a leveling film (OC), an orientation film (AL3) for an incorporated retardation film, the incorporated retardation film (RET), a protective film (POC), a step forming layer (MR), and an orientation film (AL2) are formed in order from the glass substrate (SUB2) to the liquid crystal layer (LC). Here, a polarizer (POL2) is formed outside the glass substrate (SUB2).

Further, on a liquid crystal layer side of the glass substrate (SUB1; also referred to as a TFT substrate), an insulation film (PAS4), a gate insulation film (GI), scanning lines (also referred to as gate lines) (GL), an interlayer insulation film (PAS3), video lines (also referred to as source lines or drain lines, not shown in the drawings) (DL), an interlayer insulation film (PAS1), counter electrodes (COM; also referred to as common electrodes), reflective electrodes (RAL), an interlayer insulation film (PAS2), pixel electrodes (PIX), and an orientation film (AL1) are formed in order from the glass substrate (SUB1) to the liquid crystal layer (LC). Here, a polarizer (POL1) is formed outside the glass substrate (SUB1).

Further, the counter electrode (COM) is formed in a planar shape. The pixel electrodes (PIX) and the counter electrodes (COM) are overlapped to each other by way of the interlayer insulation film (PAS2). The pixel electrodes (PIX) and the counter electrodes (COM) are formed of a transparent conductive film such as an ITO (Indium Tin Oxide) film, for example. Due to such a constitution, a holding capacitance is formed. Here, the interlayer insulation film (PAS2) is not limited to one layer and may be formed of two or more layers.

The reflective portion 131 includes reflective electrodes (RAL). Further, the reflective electrodes (RAL) may be formed of a metal film made of aluminum (Al) or may adopt the two-layered structure consisting of a lower layer made of molybdenum (Mo) and an upper layer made of aluminum (Al).

Also in the transflective liquid crystal display device of this embodiment, the pixel electrodes (PIX) and the planar counter electrodes (COM) are stacked by way of the interlayer insulation film (PAS2), and arcuate electric lines of force which are formed between the pixel electrodes (PIX) and the counter electrodes (COM) are distributed in a state that the electric lines of force penetrates the liquid crystal layer (LC) and hence, the orientation of the liquid crystal layer (LC) is changed.

A length of a cell gap of the reflective portion 131 is set to an approximately half of a length of a cell gap of the transmissive portion 130. This is because that the light passes the liquid crystal layer (LC) twice due to the reciprocation in the reflective portion 131 and hence, an optical path length of the transmissive portion 130 and an optical path length of the reflective portion 131 are made to substantially agree with each other.

In the transmissive portion 130, contrast of light is displayed by making use of the birefringence of the liquid crystal layer (LC), while in the reflective portion 131, contrast of light is displayed by making use of the birefringence of the incorporated retardation film (RET) which is arranged inside a liquid crystal display panel and the liquid crystal layer (LC).

Figure 3:
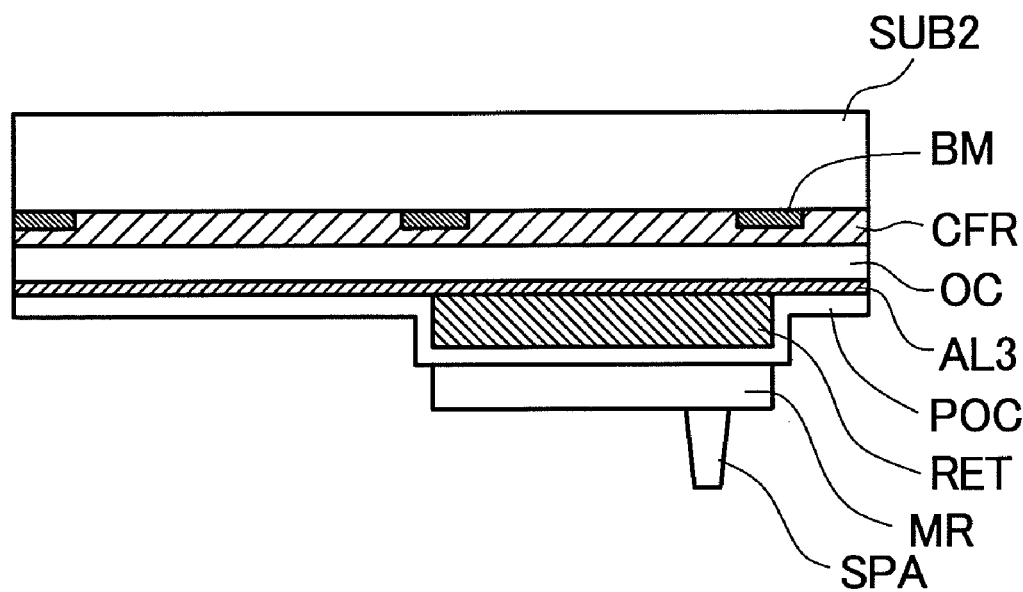
FIG. 3 is a view showing only the constitution of a glass substrate (SUB2) side in FIG. 2.

FIG. 3 is a view showing only the constitution of a glass substrate (SUB2) side in FIG. 2. In FIG. 3, symbol SPA indicates columnar spacers.

Figure 13:
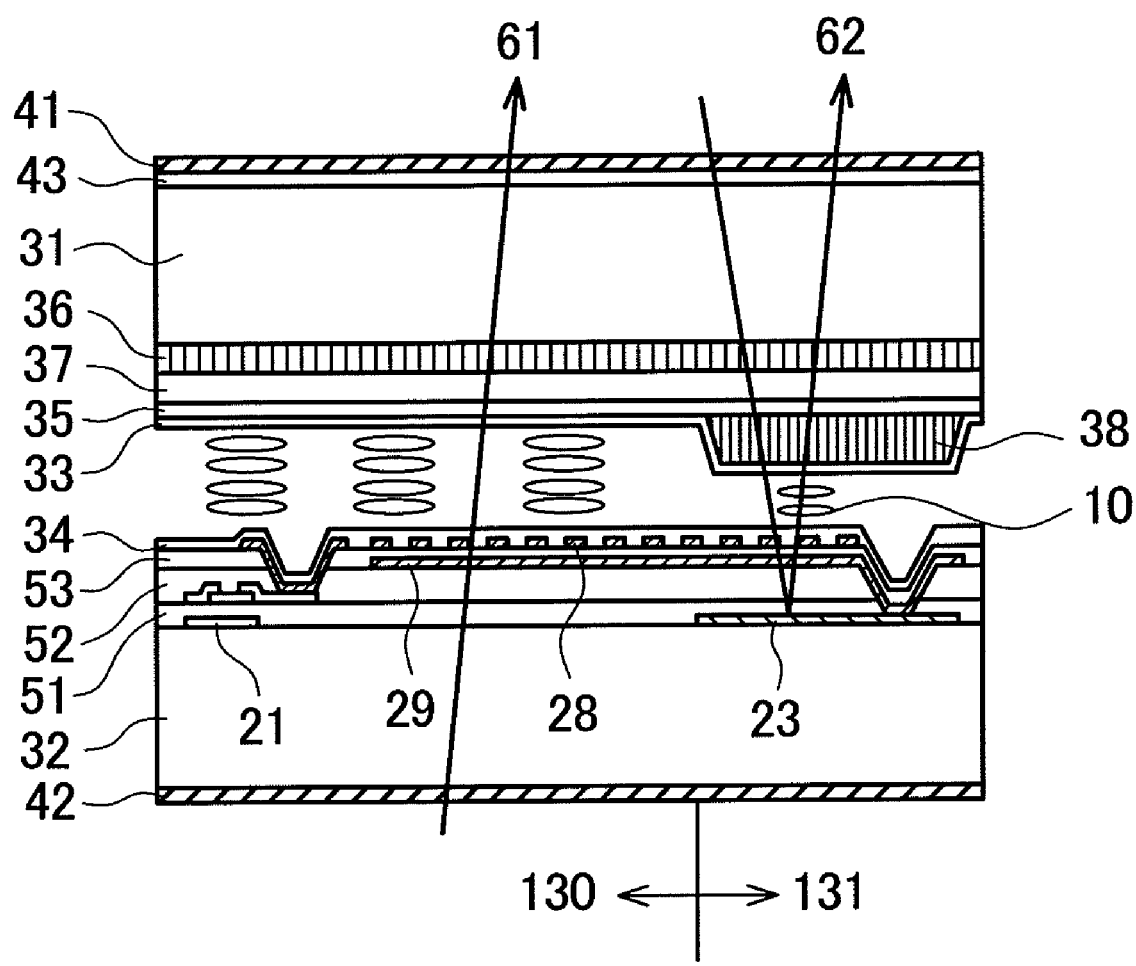
FIG. 13 is a cross-sectional view showing the cross-sectional structure of an essential part of one sub pixel of one example of the conventional transflective liquid crystal display device.

The constitution which makes the transflective liquid crystal display device of this embodiment differ from the above-mentioned conventional transflective liquid crystal display device shown in FIG. 13 lies in that a protective film (POC) made of a transparent resin or the like, for example, is formed on the incorporated retardation film (RET).

The incorporated retardation film (RET) is formed by a following method, for example.

To the orientation film (AL3) which is formed on the leveling film (OC), orientation treatment is applied using a rubbing method. Here, the orientation film (AL3) has a function of determining the delay-phase-axis direction of the incorporated retardation film (RET).

Liquid crystal having a photoreactive acrylic group at a molecular terminal thereof and an organic solvent containing a reaction initiator are applied to the orientation film (AL3) and are heated thus removing the organic solvent. At this point of time, the photoreactive liquid crystal is oriented in the orientation treatment direction of the orientation film (AL3). Next, by radiating ultraviolet rays to the liquid crystal, the acrylic group is photopolymerized and a liquid crystal film is formed. In this case, the ultraviolet rays are radiated to the liquid crystal using a photo mask such that portions which are exposed by the ultraviolet rays have the substantially same distribution as the reflective portion 131.

Next, developing is performed by eluting unexposed portions to which the ultraviolet rays are not radiated using an organic solvent thus forming the patterned incorporated retardation film (RET) in the same manner as the reflective portions 131. Here, as the above-mentioned organic solvent, acetone, cyclohexanone, cyclopentanone, cycloheptanone, propylene glycol methyl ether acetate, and lower alcohol such as methanol, ethanol, propanol and butanol can be used in a single form or in combination. Specifically, it is preferable to use cyclohexanone, cyclopentanone or propylene glycol methyl ether acetate.

In this embodiment, the protective film (POC) covers the incorporated retardation film (RET) and hence, for example, it is possible to protect the incorporated retardation film (RET) from an influence factor at the time of performing processing such as coloring by the radiation of UV or DUV (deep ultraviolet rays) in the exposure processing for forming the columnar spacers (SPA).

Further, together with the incorporated retardation film (RET), the protective film (POC) may be also formed on the orientation film (AL3). Due to such a constitution, it is also possible to obtain an effect to prevent the coloring or decomposition of the orientation film attributed to the radiation of UV or DUV in performing exposure processing for forming the columnar spacers (SPA), for example.

Further, for example, when only the step forming layer (MR) for adjusting the reflective portion gap made of a transparent resin film is used, there may be a case that the gap length of the reflective portion 131 can not be adjusted. However, by changing a film thickness of the protective film (POC), it may be possible to complement the adjustment of the gap length of the reflective portion 131 while maintaining a protective effect of the protective film (POC).

Further, in this embodiment, the black matrix (BM) is formed in boundary regions between the transmissive portions 130 and the reflective portions 131 and hence, leaking of light from the boundary portions between the transmissive portions 130 the reflective portions 131 can be prevented thus realizing the transmitting property and contrast comparable to the transmitting property and contrast of a transmissive liquid crystal display device in the transmissive portion 130.

Figure 4:
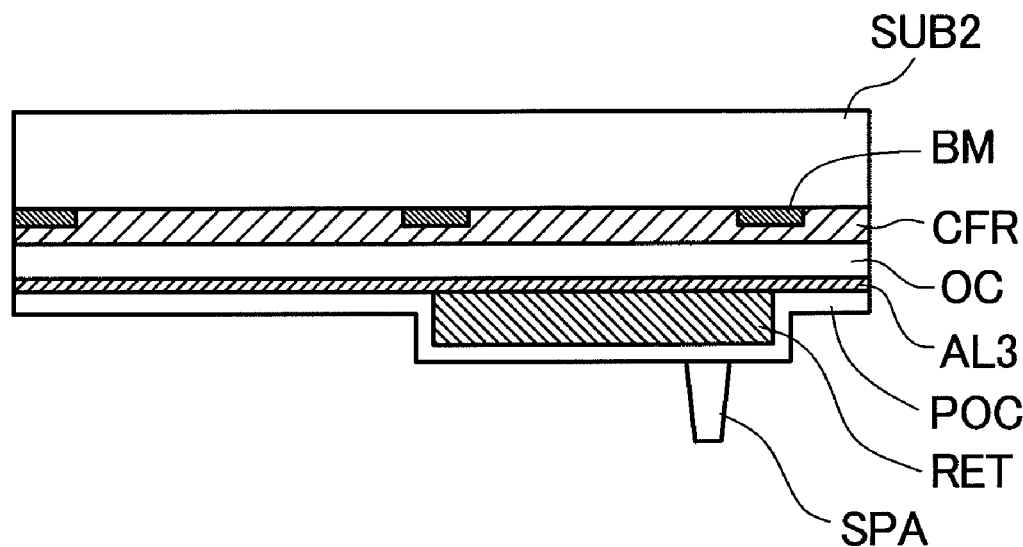
FIG. 4 is a view showing the constitution of a modification 1 of a glass substrate (SUB2) side shown in FIG. 2.

FIG. 4 is a view showing the constitution of a modification 1 of the glass substrate (SUB2) side shown in FIG. 2.

The modification 1 shown in FIG. 4 is characterized by omitting the step forming layer (MR).

When the adjustment of the gap length of the reflective portion 131 is unnecessary in view of the product structure of the selection of the materials, for example, in view of a design which conforms to a gap length of the incorporated retardation film (RET), the step forming layer (MR) becomes unnecessary and hence, the step forming layer (MR) can be omitted. Accordingly, the modification 1 shown in FIG. 4 can achieve the saving of process.

Figure 5:
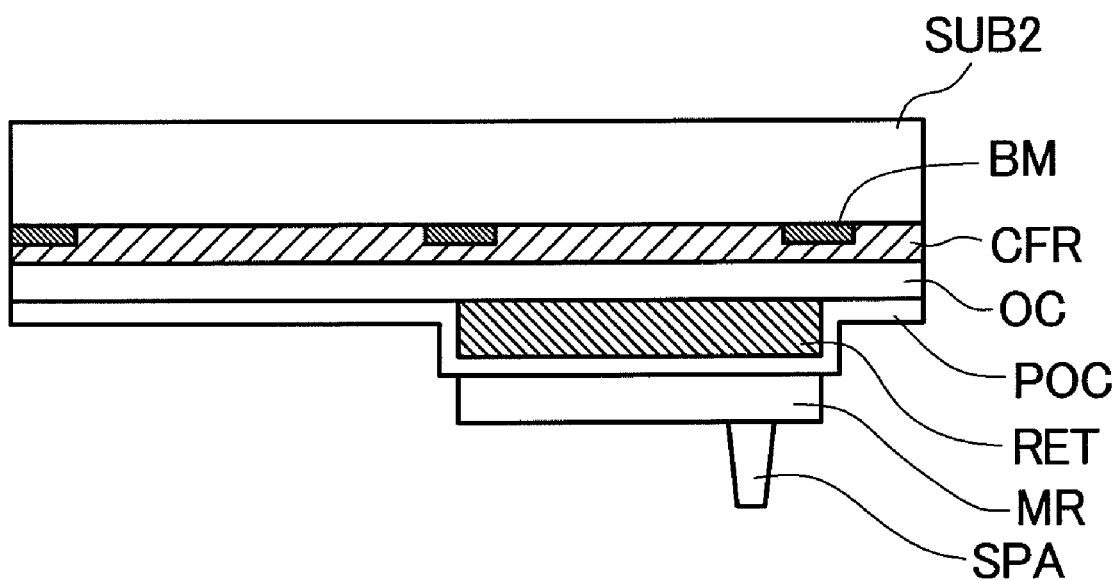
FIG. 5 is a view showing the constitution of a modification 2 of a glass substrate (SUB2) side shown in FIG. 2.

FIG. 5 is a view showing the constitution of a modification 2 of the glass substrate (SUB2) side shown in FIG. 2.

The modification 2 shown in FIG. 5 is characterized by omitting the orientation film (AL3).

Using a film to which the orientation is applicable as the leveling film (OC), the orientation film (AL3) can be omitted. That is, the modification 2 shown in FIG. 5 can achieve the saving of process and, at the same time, can expect the enhancement of property of the glass substrate (SUB2) side by eliminating the orientation film (AL3) which becomes a factor for generating coloring.

Figure 6:
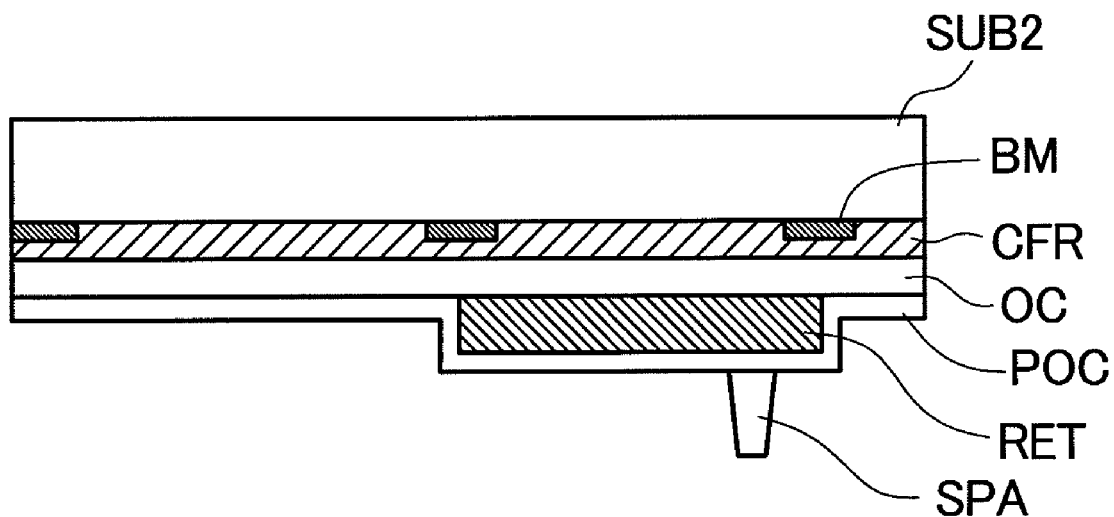
FIG. 6 is a view showing the constitution of a modification 3 of a glass substrate (SUB2) side shown in FIG. 2.

FIG. 6 is a view showing the constitution of a modification 3 of the glass substrate (SUB2) side shown in FIG. 2.

The modification 3 shown in FIG. 6 is, in the modification 2 shown in FIG. 5, characterized by omitting the step forming layer (MR) in the same manner as the modification 1 shown in FIG. 4.

Also in the modification 3 shown in FIG. 6, when the adjustment of the gap length is unnecessary, the step forming layer (MR) can be omitted. Accordingly, the modification 3 shown in FIG. 6 can cooperatively make use of the respective advantages of the modification 1 shown in FIG. 4 and the modification 2 shown in FIG. 5.

Figure 7:
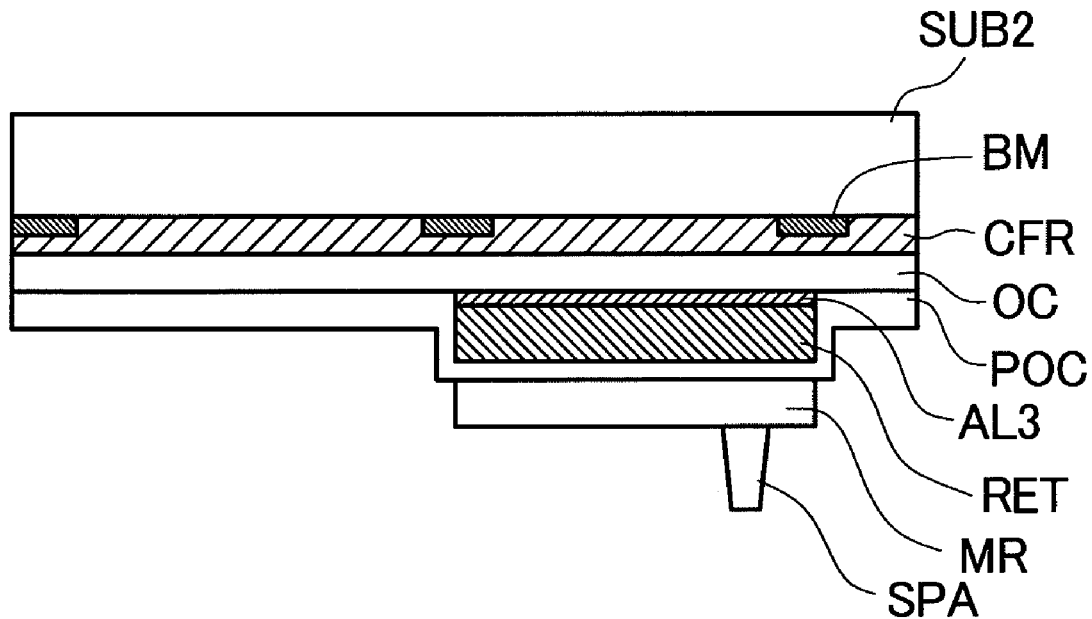
FIG. 7 is a view showing the constitution of a modification 4 of a glass substrate (SUB2) side shown in FIG. 2.

FIG. 7 is a view showing the constitution of a modification 4 of the glass substrate (SUB2) side shown in FIG. 2.

The modification 4 shown in FIG. 7 is characterized by forming the orientation film (AL3) on only the reflective portions 131 in the constitution shown in FIG. 2.

For example, by adopting fusible polyimide or the like as a material of the orientation film (AL3), it is possible to form the orientation film (AL3) on only the reflective portions 131. Accordingly, in the modification 4 shown in FIG. 7, it is possible to eliminate the influence on the transmissive portions 130 and hence, it is possible to expect the enhancement of property of the glass substrate (SUB2) side.

Figure 8:
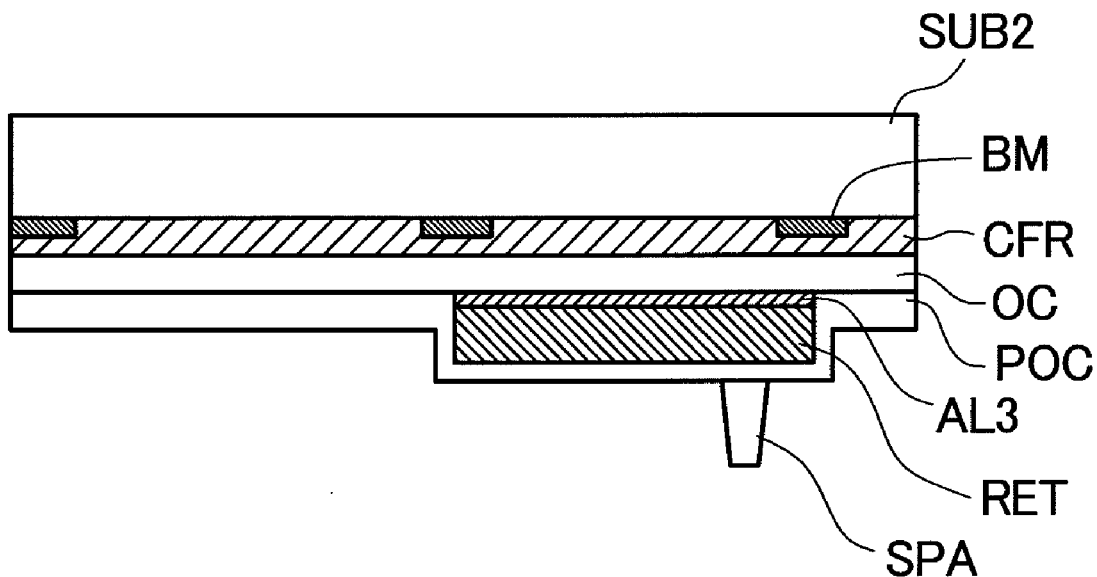
FIG. 8 is a view showing the constitution of a modification 5 of a glass substrate (SUB2) side shown in FIG. 2.

FIG. 8 is a view showing the constitution of a modification 5 of the glass substrate (SUB2) side shown in FIG. 2.

The modification 5 shown in FIG. 8 is, in the modification 4 shown in FIG. 7, characterized by omitting the step forming layer (MR) in the same manner as the modification 1 shown in FIG. 4.

Also in the modification 5 shown in FIG. 8, when the adjustment of the gap length is unnecessary, the step forming layer (MR) can be omitted. Accordingly, the modification 5 shown in FIG. 8 can cooperatively make use of the respective advantages of the modification 1 shown in FIG. 4 and the modification 4 shown in FIG. 7.

Figure 9:
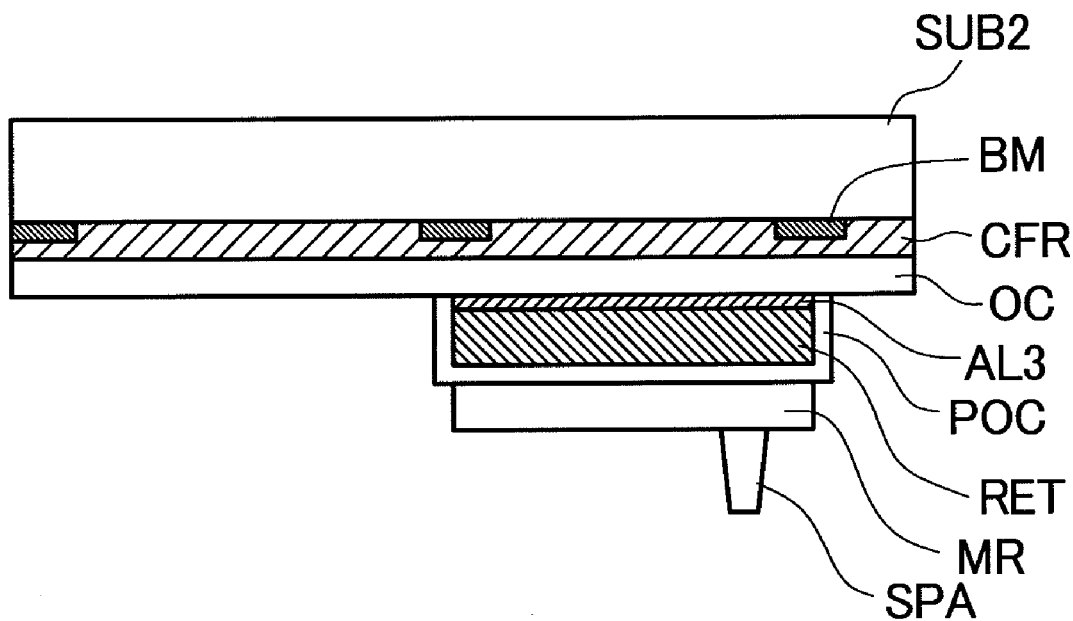
FIG. 9 is a view showing the constitution of a modification 6 of a glass substrate (SUB2) side shown in FIG. 2.

FIG. 9 is a view showing the constitution of a modification 6 of the glass substrate (SUB2) side shown in FIG. 2.

The modification 6 shown in FIG. 9 is, in the modification 4 shown in FIG. 7, characterized by forming the protective film (POC) on only the reflective portions 131 to be protected. In the modification 6 shown in FIG. 9, it is possible to reduce the stacked structure of the transmissive portion 130 and hence, it is possible to expect the enhancement of property of the glass substrate (SUB2) side.

Figure 10:
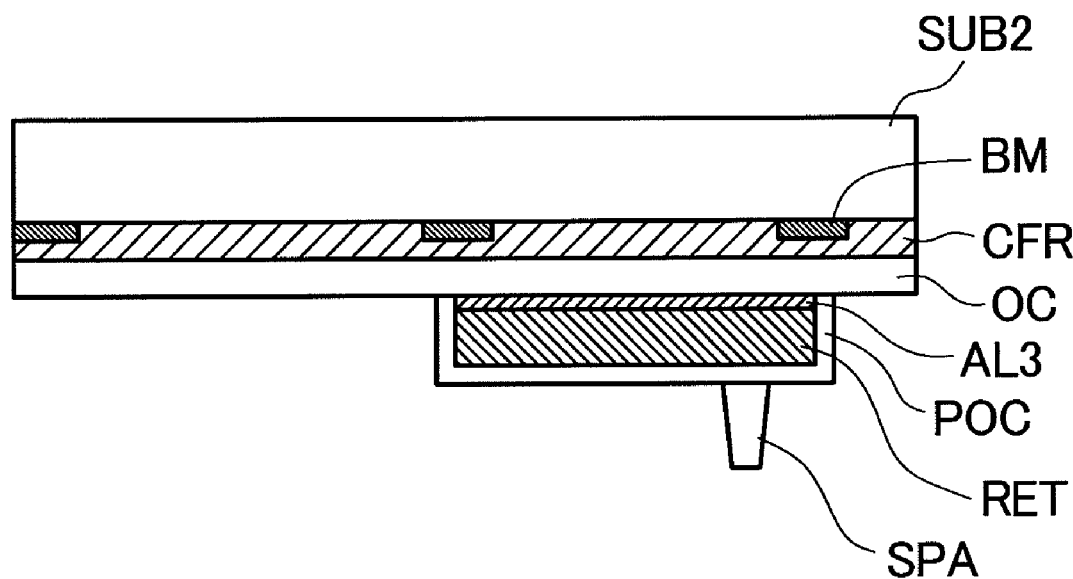
FIG. 10 is a view showing the constitution of a modification 7 of a glass substrate (SUB2) side shown in FIG. 2.

FIG. 10 is a view showing the constitution of a modification 7 of the glass substrate (SUB2) side shown in FIG. 2.

The modification 7 shown in FIG. 10 is, in the modification 6 shown in FIG. 9, characterized by omitting the step forming layer (MR) in the same manner as the modification 1 shown in FIG. 4.

Also in the modification 7 shown in FIG. 10, when the adjustment of the gap length is unnecessary, the step forming layer (MR) can be omitted. Accordingly, the modification 7 shown in FIG. 10 can cooperatively make use of the respective advantages of the modification 1 shown in FIG. 4 and the modification 6 shown in FIG. 9.

As explained heretofore, according to the embodiments of the invention, in the transflective liquid crystal display device which incorporates the incorporated retardation film (RET) in the color filter substrate side, the incorporated retardation film (RET) is covered with the protective film (POC) and hence, it is possible to prevent the incorporated retardation film (RET) from being damaged or the like thus enhancing the reliability of the transflective liquid crystal display device.

Here, in the above-mentioned explanation, the embodiment in which the invention is applied to the IPS-type transflective liquid crystal display device has been explained. However, the invention is not limited to the above-mentioned embodiments, and the invention is also applicable to an ECB-type transflective liquid crystal display device shown in FIG. 11 or a VA-type transflective liquid crystal display device shown in FIG. 12.

Figure 11:
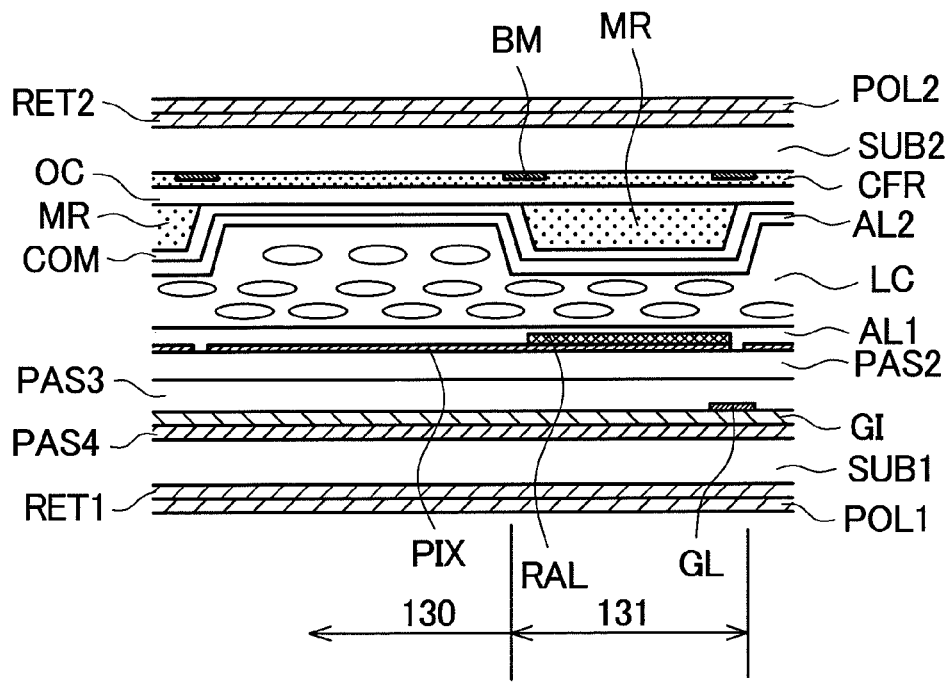
FIG. 11 is a cross-sectional view showing the cross-sectional structure of an essential part of a conventional ECB-type transflective liquid crystal display device.

FIG. 11 is a cross-sectional view showing the cross-sectional structure of an essential part of the conventional ECB-type transflective liquid crystal display device. The ECB-type transflective liquid crystal display device includes a pair of glass substrates (SUB1, SUB2) which sandwiches a liquid crystal layer (LC) therebetween. In the transflective liquid crystal display device shown in FIG. 11, a main surface side of a glass substrate (SUB2; also referred to as a CF substrate) constitutes an observation side.

On a liquid crystal layer side of the glass substrate (SUB2), a black matrix (BM), color filter layers of red, green and blue (CFR, CFG, CFB), a leveling film (OC), a step forming layer (MR), counter electrodes (COM; also referred to as common electrodes), and an orientation film (AL2) are formed in order from the glass substrate (SUB2) to the liquid crystal layer (LC). Here, a retardation plate (RET1) and a polarizer (POL2) are formed outside the glass substrate (SUB2).

Further, on a liquid crystal layer side of the glass substrate (SUB1; also referred to as a TFT substrate), an insulation film (PAS4), a gate insulation film (GI), scanning lines (also referred to as gate lines) (GL), an interlayer insulation film (PAS3), video lines (also referred to as source lines or drain lines, not shown in the drawings) (DL), an interlayer insulation film (PAS1), pixel electrodes (PIX), an orientation film (AL1), and reflective electrodes (RAL) are formed in order from the glass substrate (SUB1) to the liquid crystal layer (LC) Here, the retardation plate (RET1) and a polarizer (POL1) are formed outside the glass substrate (SUB1).

In the transflective liquid crystal display device shown in FIG. 11, the planar pixel electrodes (PIX) are formed on the glass substrate (SUB1) side, and the counter electrodes (COM) are commonly formed on the glass substrate (SUB2) side in a planar shape, and the orientation of the liquid crystal layer (LC) is changed by a vertical electric field which is formed between the pixel electrodes (PIX) and the counter electrodes (COM) The initial orientation of the liquid crystal layer (LC) is the horizontal orientation, and the horizontal orientation is shifted to the electric-field direction by applying the vertical electric field to the liquid crystal.

The retardation plate (RET1) and the polarizer (POL1) are arranged outside the glass substrate (SUB1), the retardation plate (RET2) and the polarizer (POL2) are arranged outside the glass substrate (SUB2), and the transmissive portions 130 and the reflective portions 131 display the contrast of light by making use of the birefringence of the retardation plates (RET1, RET2) and the liquid crystal layer (LC).

Figure 12:
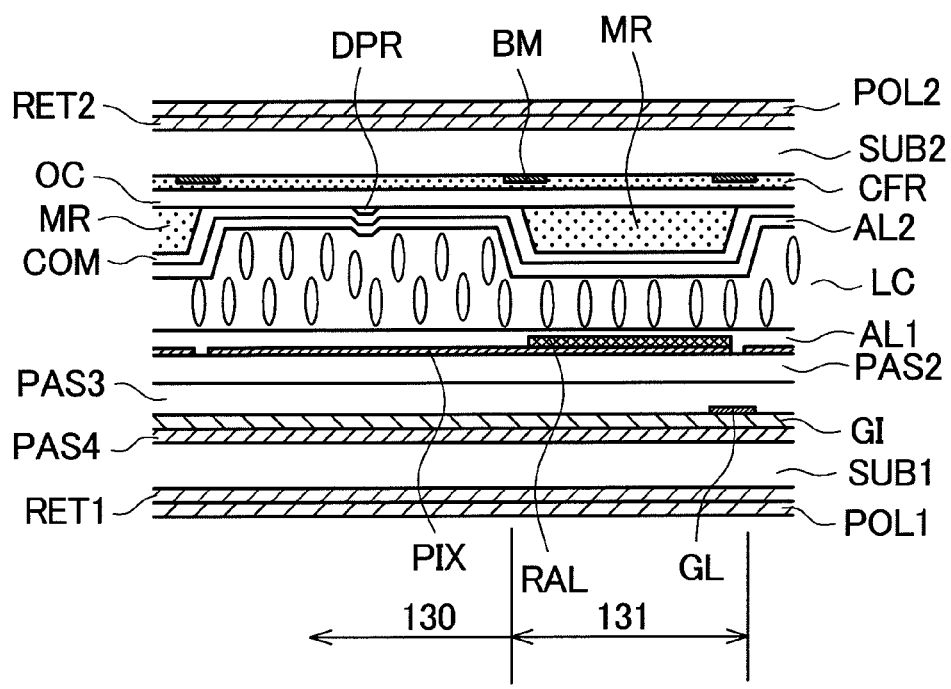
FIG. 12 is a cross-sectional view showing the cross-sectional structure of an essential part of a conventional VA-type transflective liquid crystal display device.

FIG. 12 is a cross-sectional view showing a cross-sectional structure of an essential part of a conventional VA-type transflective liquid crystal display device. The VA-type transflective liquid crystal display device includes a pair of glass substrates (SUB1, SUB2) which sandwiches a liquid crystal layer (LC) therebetween. In the transflective liquid crystal display device shown in FIG. 12, a main surface side of a glass substrate (SUB2; also referred to as a CF substrate) constitutes an observation side.

On a liquid crystal layer side of the glass substrate (SUB2), a black matrix (BM), color filter layers of red, green and blue (CFR, CFG, CFB), a leveling film (OC), a step forming layer (MR), orientation control projections (DPR), counter electrodes (COM; also referred to as common electrodes), and an orientation film (AL2) are formed in order from the glass substrate (SUB2) to the liquid crystal layer (LC). Here, a retardation plate (RET1) and a polarizer (POL2) are formed outside the glass substrate (SUB2).

Further, on the liquid crystal layer side of the glass substrate (SUB1; also referred to as a TFT substrate), an insulation film (PAS4), a gate insulation film (GI), scanning lines (also referred to as gate lines) (GL), an interlayer insulation film (PAS3), video lines (also referred to as source lines or drain lines, not shown in the drawings) (DL), an interlayer insulation film (PAS1), pixel electrodes (PIX), an orientation film (AL1), and reflective electrodes (RAL) are formed in order from the glass substrate (SUB1) to the liquid crystal layer (LC). Here, the retardation plate (RET1) and a polarizer (POL1) are formed outside the glass substrate (SUB1)

In the transflective liquid crystal display device shown in FIG. 12, the planar pixel electrodes (PIX) are formed on the substrate (SUB1) side, and the counter electrodes (COM) are commonly formed on the glass substrate (SUB2) side in a planar shape, and an orientation of the liquid crystal layer (LC) is changed by a vertical electric field which is formed between the pixel electrodes (PIX) and the counter electrodes (COM). The initial orientation of the liquid crystal layer (LC) is the vertical orientation, and liquid crystal molecules are arranged in a tilting manner so as to become parallel to the substrate due to the vertical electric field. Here, the direction that the liquid crystal molecules are tilted is controlled by an orientation direction control means, for example, the orientation control projections (DPR).

The retardation plate (RET1) and the polarizer (POL1) are formed outside the glass substrate (SUB1), the retardation plate (RET2) and the polarizer (POL2) are formed outside the glass substrate (SUB2), and the transmissive portions 130 and the reflective portions 131 display the contrast of light by making use of the birefringence of the retardation plates (RET1, RET2) and the liquid crystal layer (LC).

Although the inventions made by the inventors of the present invention have been specifically explained in conjunction with the above-mentioned embodiments heretofore, it is needless to say that the present inventions are not limited to the above-mentioned embodiments and various modifications are conceivable without departing from the gist of the present inventions.

What is claimed is:

1. A liquid crystal display device including a liquid crystal display panel, the liquid crystal display panel comprising:
   a pair of substrates;
   liquid crystal which is sandwiched between the pair of substrates;
   a plurality of sub pixels, each sub pixel including a transmissive portion and a reflective portion;
   a light blocking film which is formed on one substrate out of the pair of substrates;
   color filters which are formed on one substrate out of the pair of substrates;
   a leveling film which is formed on the light blocking film and the color filters;
   an orientation film which is formed on the leveling film;
   a retardation film which is formed on the orientation film at portions corresponding to the reflective portions of the respective sub pixels; and
   a protective film which is formed on the orientation film and the retardation film.

2. A liquid crystal display device according to claim 1, wherein the leveling film functions also as the orientation film.

3. A liquid crystal display device according to claim 1, wherein the liquid crystal display panel further includes a gap adjusting layer which is formed on the protective film.

4. A liquid crystal display device according to claim 1, wherein the retardation film is made of a polymer liquid crystal material.

5. A liquid crystal display device according to claim 1, wherein at least the light blocking film is formed in a boundary region between the transmissive portion and the reflective portion of each sub pixel.

6. A liquid crystal display device according to claim 1, wherein pixel electrodes and counter electrodes are formed on another substrate different from one substrate out of the pair of substrates.

7. A liquid crystal display device according to claim 6, wherein an interlayer insulation film is formed on the counter electrodes, and the pixel electrodes are formed on the interlayer insulation film.

8. A liquid crystal display device according to claim 6, wherein a portion of the counter electrode corresponding to the reflective portion constitutes a reflective electrode.

9. A liquid crystal display device according to claim 1, wherein the counter electrodes are formed on one substrate out of the pair of substrates, and the pixel electrodes are formed on another substrate different from one substrate.

10. A liquid crystal display device including a liquid crystal display panel, the liquid crystal display panel comprising:
    a pair of substrates;
    liquid crystal which is sandwiched between the pair of substrates;
    a plurality of sub pixels, each sub pixel including a transmissive portion and a reflective portion;
    a light blocking film which is formed on one substrate out of the pair of substrates;
    color filters which are formed on one substrate out of the pair of substrates;
    a leveling film which is formed on the light blocking film and the color filters;
    an orientation film which is formed on the leveling film at portions corresponding to the reflective portions of the respective sub pixels;
    a retardation film which is formed on the orientation film; and
    a protective film which is formed on the leveling film and the retardation film.

11. A liquid crystal display device including a liquid crystal display panel, the liquid crystal display panel comprising:
    a pair of substrates;
    a liquid crystal which is sandwiched between the pair of substrates;
    a plurality of sub pixels, each sub pixel including a transmissive portion and a reflective portion;
    a light blocking film which is formed on one substrate out of the pair of substrates;
    color filters which are formed on one substrate out of the pair of substrates;
    a leveling film which is formed on the light blocking film and the color filters;
    an orientation film which is formed on the leveling film at portions corresponding to the reflective portions of the respective sub pixels;
    a retardation film which is formed on the orientation film; and
    a protective film which is formed on the retardation film.

* * * * *